United States Patent
Chow et al.

(10) Patent No.: US 12,469,541 B2
(45) Date of Patent: Nov. 11, 2025

(54) OFFSET CALIBRATION METHOD AND APPARATUS FOR HIGH BANDWIDTH MEMORY 3 (HBM3)

(71) Applicant: SKYECHIP SDN BHD, Pulau Pinang (MY)

(72) Inventors: Tze Jian Chow, Pulau Pinang (MY); Hoong Chin Ng, Pulau Pinang (MY); Tat Hin Tan, Pulau Pinang (MY); Chee Hak Teh, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 114 days.

(21) Appl. No.: 18/423,817

(22) Filed: Jan. 26, 2024

(65) Prior Publication Data
US 2025/0182811 A1    Jun. 5, 2025

(30) Foreign Application Priority Data
Dec. 5, 2023   (MY) .............................. 2023007402

(51) Int. Cl.
*G11C 11/4076* (2006.01)
(52) U.S. Cl.
CPC ................. *G11C 11/4076* (2013.01)
(58) Field of Classification Search
CPC .................................................. G11C 11/4076
USPC .................................................. 365/193, 195
See application file for complete search history.

(56) References Cited

U.S. PATENT DOCUMENTS

| | | | |
|---|---|---|---|
| 6,593,871 B1* | 7/2003 | Miethig | H03M 1/1255 341/157 |
| 10,720,201 B2 | 7/2020 | Hiraishi | |
| 2014/0314173 A1 | 10/2014 | Hekmat et al. | |
| 2015/0043702 A1* | 2/2015 | Kwon | H03K 21/38 377/47 |
| 2017/0093386 A1* | 3/2017 | Kitagawa | H03K 5/159 |
| 2017/0200489 A1* | 7/2017 | Giovannini | G06F 12/0646 |
| 2021/0011657 A1* | 1/2021 | Sheperek | G11C 29/4401 |

FOREIGN PATENT DOCUMENTS

JP         2012090167 A       5/2012

* cited by examiner

*Primary Examiner* — Michael T Tran
(74) *Attorney, Agent, or Firm* — Jayne Saydah (57) ABSTRACT

The present invention discloses a computer-implemented method for offset calibration and an integrated circuit (IC) memory controller for offset calibration. Said method comprises the step of: performing offset calibration of a receiver read-data strobe replica; conditioning pad voltages of a receiver read-data strobe and the receiver read-data strobe replica based on an offset calibration value of the receiver read-data strobe replica; and performing offset calibration of the receiver read-data strobe based on an offset calibration value of the pad voltages; wherein disabling differential inputs of transmission gate from a differential strobe signal pins to the receiver read-data strobe replica during receiver read-data strobe replica offset calibration.

10 Claims, 6 Drawing Sheets

OFFSET CALIBRATION METHOD AND APPARATUS FOR HIGH BANDWIDTH MEMORY 3 (HBM3)

CROSS-REFERENCE TO RELATED APPLICATION(S)

This application claims priority from and the benefit of Malaysia Patent Application No. PI2023007402 filed on Dec. 5, 2023, which is hereby incorporated by reference in its entirety.

TECHNICAL FIELD

The present invention relates to an offset calibration method for High Bandwidth Memory 3 (HBM3), particularly utilizes a proposed offset calibration method employing a pad voltage divider to reduce signal attenuation.

BACKGROUND ART

A memory technology called High Bandwidth Memory 3 (HBM3) provides bandwidth and data transfer rates for modern computer systems. Precise signal integrity is becoming increasingly necessary as the memory technology develops to reach its full potential. A crucial element in guaranteeing resilient data transmission is the adjustment of signal offsets.

Offset calibration techniques have been limited in previous HBM3 inventions, especially when it came to reducing signal attenuation. Conventional methods have difficulty preserving signal integrity, which frequently results in a decreased demand for creative calibration methods that can handle signal attenuation. A method of strategically reducing signal attenuation is needed to further enhance signal quality and ensuring seamless high-speed data transmission.

There have been a number of solutions provided for data transferring in computer memory in which few of them are discussed below:

U.S. Pat. No. 10,720,201B2 disclosed an apparatuses for receiving an input signal in a semiconductor device are described. An example apparatus includes a signal receiver that receives information signal: a control circuit that provides a plurality of control signals; and a signal receiver replica circuit that receives a first reference signal. The signal receiver replica circuit includes a plurality of receivers. Each receiver of the plurality of receivers receives the first reference signal and a corresponding control signal of the plurality of control signals, and further provides an output signal.

US2014314173A1 disclosed an automatically calibrated differential amplifier including: an input stage differential amplifier configured to receive a input differential signal, to differentially amplify the input differential signal to generate an input stage output differential signal, and to have an input stage bias current; and a replica stage differential amplifier configured to automatically calibrate the input stage bias current in response to process or environmental variations. The differential amplifier may be included, for example, in a comparator and a multilevel receiver.

JP2012090167A disclosed replica circuits are variable in impedance and output a voltage corresponding to the impedance. A reference voltage generation section outputs a reference voltage depending on a supply voltage to the output buffer. A comparison section compares the output voltage of the replica circuit with the reference voltage. An adjustment section adjusts the impedance of the replica circuit in accordance with the comparison result of the comparison section.

Nevertheless, the references described above and other existing techniques still suffer from a number of problems of which the objectives and features of the present invention attempts to address. For example, industries such as computer architecture that needs to deal with signal attenuation. Therefore, it can be seen that there is a need to provide a solution especially to overcome the stated problem that enables more optimal performance in high-speed bins HBM3.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a computer-implemented method of offset calibration method to minimize pad attenuation.

A further objective of the present invention is to form potential divider to condition the pad voltages for receiver read-data strobe offset calibration.

It is also an objective of the present invention for receiver read-data strobe replica to be used to as comparator to calibrate differential pad voltage to a common voltage reference value for receiver read-data strobe offset calibration.

Another objective of the present invention is to replicate receiver read-data strobe delay for receiver read-data strobe signal periodic VT timing calibration.

Accordingly, these objectives may be achieved by following the teachings of the present invention. The present invention relates to an integrated circuit (IC) memory controller for offset calibration, comprising: a receiver read-data strobe for receiving and processing read-data strobe signal; characterized by a receiver read-data strobe replica communicably connected to the receiver read-data strobe; a pad voltage divider connecting a pad voltage of the receiver read-data strobe and a pad voltage of the receiver read-data strobe replica; and a transmitter, each connected to true read-data strobe and complement read-data strobe to condition the pad voltages; wherein the receiver read-data strobe replica calibrates pad voltage of a differential voltage to a common voltage for the receiver's read-data strobe offset calibration.

The present invention also relates to a computer-implemented method of for offset calibration of an integrated circuit memory controller based on pad voltage divider, characterized in that said method comprises the step of: performing offset calibration of a receiver read-data strobe replica offset calibration; conditioning pad voltages of the receiver read-data strobe and the receiver read-data strobe replica based on an offset calibration value of the receiver read-data strobe replica; and performing offset calibration of the receiver read-data strobe based on the offset calibration value of the pad voltages; wherein transmission gate from the differential strobe signal pins to the receiver read-data strobe replica differential inputs is disabled during receiver read-data strobe replica offset calibration.

The foregoing and other objects, features, aspects and advantages of the present invention will become better understood from a careful reading of a detailed description provided herein below with appropriate reference to the accompanying drawings.

BRIEF DESCRIPTION OF THE ACCOMPANYING DRAWING

So that the manner which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed descriptions are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein are solely used for descriptive purposes and should not be construed as limiting in scope. Language such as "including," "comprising," "having," "containing," or "involving," and variations thereof, is intended to be broad and encompasses the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is be understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

Referring to the drawing as shown in FIGS. 1 to 6, the present invention will now be described in more detail.

An embodiment of the present invention relates to a computer-implemented method for offset calibration of an integrated circuit memory controller, characterized in that said method comprises the step of: performing offset calibration of a receiver read-data strobe replica; conditioning pad voltages of a receiver read-data strobe and the receiver read-data strobe replica based on an offset calibration value of the receiver read-data strobe replica; and performing offset calibration of the receiver read-data strobe based on the offset calibration value of the pad voltages; wherein transmission gate from the differential strobe signal pins to the receiver read-data strobe replica differential inputs is disabled during receiver read-data strobe replica offset calibration; wherein dual calibration of drive control signal is executed during read-data strobe pad voltage conditioning and averaging the result of calibration.

In accordance with an embodiment of the present invention, computer-implemented method of performing offset calibration of a receiver read-data strobe signal replica comprises the step of: shortening and assigning differential inputs of the receiver read-data strobe replica to a common voltage reference value; outputting voltage value to offset calibration finite state machine for decision making; and repeating shorting until the receiver read-data strobe replica output changes to a transition point.

In accordance with an embodiment of the present invention, transmission gate from differential strobe signal to the receiver read-data strobe replica differential inputs is disabled to prevent any contention.

In accordance with an embodiment of the present invention, positive offset is introduced by repeating shorting until the receiver read-data strobe replica output changes to transition point where the intrinsic offset of receiver read-data strobe replica changes from negative offset becomes positive offset.

In accordance with an embodiment of the present invention, the last code before triggering the transition is stored and applied as the final receiver read-data strobe replica offset control code.

In accordance with an embodiment of the present invention, receiver replica offset calibration concludes and the process continues onto read-data strobe pad voltage conditioning.

In accordance with an embodiment of the present invention, computer-implemented method of conditioning pad voltages of the receiver read-data strobe and the receiver read-data strobe replica based on the offset calibration value of the receiver read-data strobe replica comprises the step of: calibrating and aligning the pad voltages, true read-data strobe and complement read-data strobe to a common voltage reference value based on the offset calibration value of the receiver read-data strobe replica; passing the differential strobe signal voltages to the inputs of receiver read-data strobe replica; and creating potential divider at the differential strobe signal for voltage transmission to the receiver read-data strobe.

In accordance with an embodiment of the present invention, the memory drive strength option for both pull up and pull down during read-data strobe pad voltage conditioning adjusted.

In accordance with an embodiment of the present invention, differential strobe signal voltages are passed to the inputs of receiver read-data strobe replica and prevent shorting to internal voltage reference through the transmission gate at the input of receiver read-data strobe replica.

In accordance with an embodiment of the present invention, the memory drive control signals are calibrated two times with input chop settings and the final value of drive control signals are obtained by averaging the result of calibration obtained from input chop settings. The input chopping is conducted to nullify any residual offset in receiver read-data strobe replica from affecting read-data strobe pad voltage conditioning.

In accordance with an embodiment of the present invention, performing offset calibration of the receiver read-data strobe based on the offset calibration value of the pad voltages comprising the steps of: assigning a common voltage reference on the receiver read-data strobe based on the calibration value of the pad voltage of the receiver read-data strobe; configuring transmission of differential strobe signal to be tristate for recovering electrical signaling of the differential pad voltages; and transitioning back the differential pad voltages to functional mode.

In accordance with an embodiment of the present invention, an integrated circuit (IC) memory controller for offset calibration, comprising: a receiver read-data strobe for receiving and processing read-data strobe signal; characterized by a replicated receiver read-data strobe communicably connected to the receiver read-data strobe; a pad voltage divider connecting a pad voltage of the receiver read-data strobe and a pad voltage of the replicated receiver read-data strobe; and a transmitter, each connected to true read-data strobe and complement read-data strobe to condition the pad voltages; wherein the replicated receiver read-data strobe calibrates pad voltage of a differential voltage to a common voltage for the receiver's read-data strobe offset calibration.

In accordance with an embodiment of the present invention, differential strobe signal pins are connected to receiver data strobe inputs.

In accordance with an embodiment of the present invention, a Finite State Machine (FSM) in the design can be implemented as synthesized hardware logic on die or through firmware programming by reading and writing control registers related to the offset cancellation.

In accordance with an embodiment of the present invention, receiver data strobe replica acts as a comparator to calibrate differential pad voltage to a common voltage reference value for receiver data strobe offset calibration.

In accordance with an embodiment of the present invention, transmission of the read data strobe enables the capability to convert read-data strobe pins to write-data strobe pins for die-to-die connection.

In accordance with an embodiment of the present invention, transmission of the read data strobe act as a variable resistor to form a potential divider with Dynamic Random Access Memory (DRAM) differential strobe signal transmitter to condition the pad voltage for receiver read-data strobe offset calibration.

In accordance with an embodiment of the present invention, the behaviour of receiver read-data strobe offset control and receiver read-data strobe replica offset control is perpendicularly to the offset cancelation wherein the lowest code is maximum negative offset while the highest code is maximum positive offset.

Hereinafter, example of the present invention will be provided for more detailed explanation. The advantages of the present invention may be more readily understood and put into practical effect from these examples. However, it is to be understood that the following examples are not intended to limit the scope of the present invention in any way.

| | Description of Subcircuits |
|---|---|
| RxDQS | Receiver Read-Data Strobe |
| RxDQS replica | Receiver Read-Data Strobe replica |
| diff_vcal_en | Differential voltage calibration enable |
| Rep_oc_cal | Replica offset calibration |
| Vref | Voltage reference |
| OC CAL FSM (REP) | Offset calibration finite state machine replica |
| OC CAL FSM (ACT) | Offset calibration finite state machine actual |
| Pu_drv_ctrl | Pull up drive control |
| Pd_drv_ctrl | Pull down drive control |
| RDQS_t | True Read-Data Strobe |
| RDQS_c | Complement Read-Data Strobe |
| Input_chop | Input chopping |
| Rxdqs_offset_ctrl | Receiver Read-Data Strobe offset control |
| Rxdqs_replica_offset_ctrl | Receiver Read-Data Strobe replica offset control |
| Tx RxDQS | Transmitter of Read-Data Strobe |

EXAMPLE

Example 1: RxDQS Replica Offset Calibration

Figure 6:
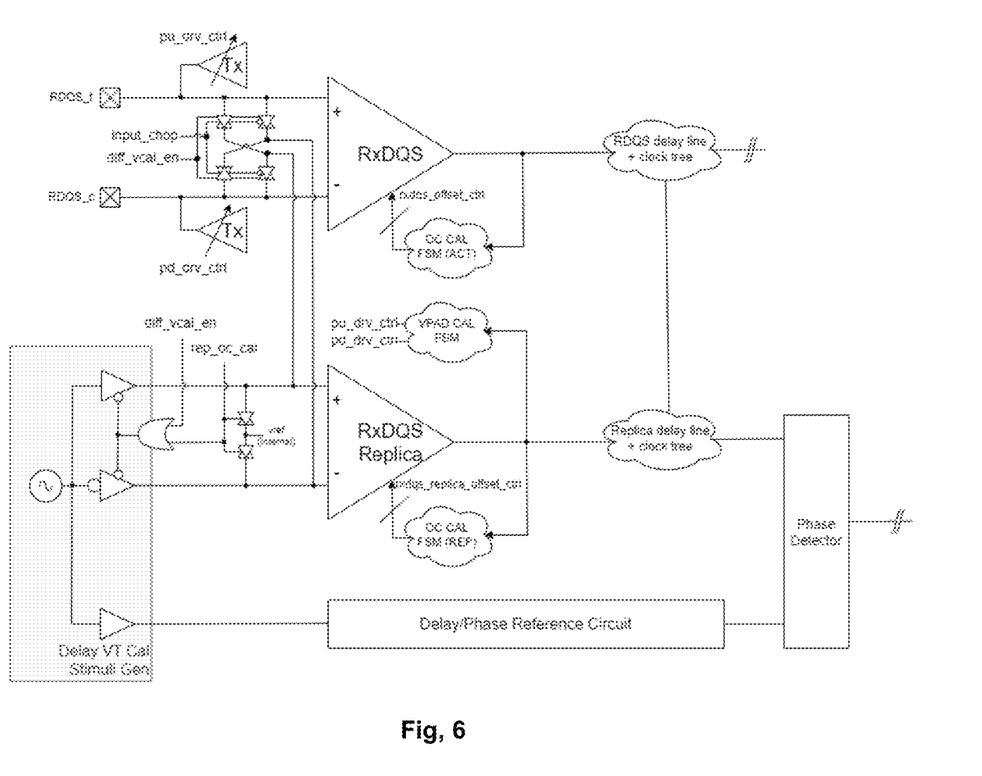
FIG. 6 Illustrates an overview of offset calibration scheme based on pad voltage divider design.

For the context of subsequent discussions, the behaviour of receiver offset control (rxdqs_offset_ctrl) and receiver replica offset control (rxdqs_replica_offset_ctrl) from FIG. 6 can be assumed in Table 1 below. The 5 bits bus width is used as an example and may be different in actual designs. As shown in Table 1, offset_ctrl 0 is the setting with maximum negative offset, while offset_ctrl 31 is the setting with maximum positive offset. From offset_ctrl 0 to 31, positive offset is gradually introduced. The middle value of offset_ctrl (16) is the middle point where no offset cancellation is introduced, hence is it a point where the offset cancellation is neutral.

Figure 1:
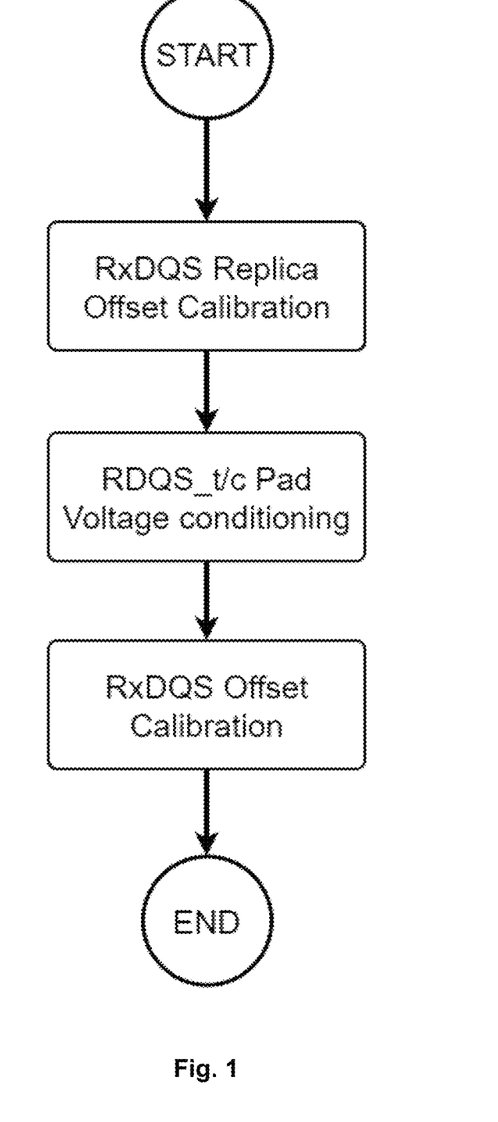
FIG. 1 is a flowchart illustrating a computer-implemented method of receiver read-data strobe offset calibration in accordance with an embodiment of the present invention.
Figure 2:
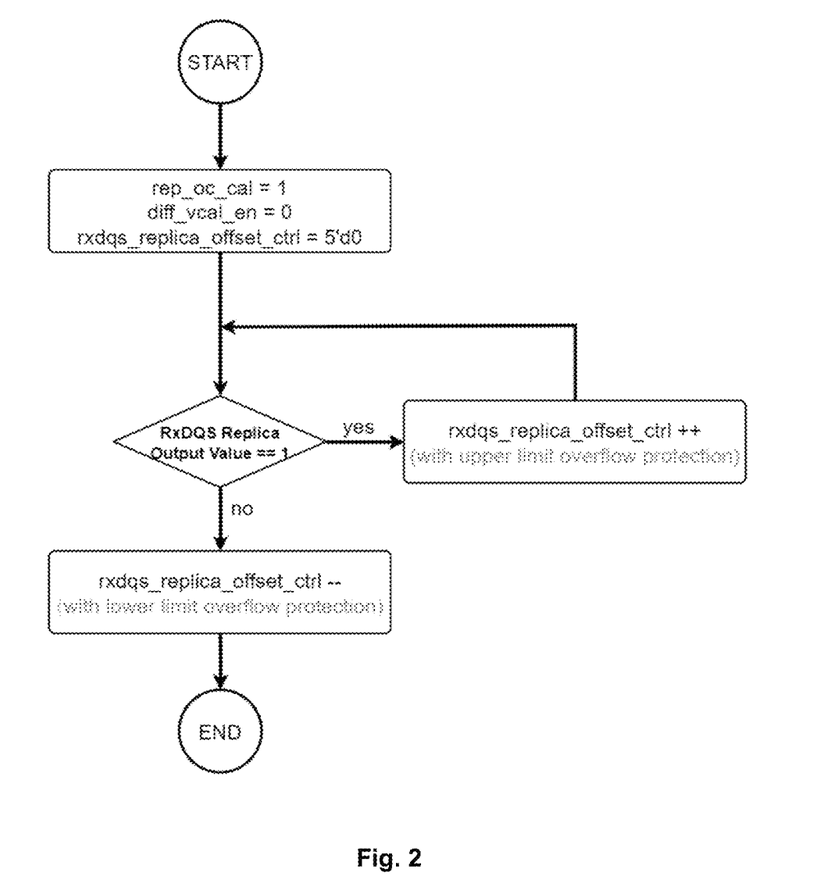
FIG. 2 is a flowchart illustrates a computer-implemented method of receiver read-data strobe replica offset calibration in accordance with an embodiment of the present invention.

First, the differential inputs of the receiver read-data strobe replica (RxDQS Replica) are shorted and assigned to a common voltage reference. This is achieved by setting replica offset calibration (rep_oc_cal) to logic 0, which would tristate the differential drivers inside the Delay Voltage/Temperature Calibration Stimuli Generator and allow internal voltage reference to be passed to the differential inputs. To prevent any contention from differential strobe signal (RDQS_t/RDQS_c), differential voltage calibration enable (diff_vcal_en) are required to be logic 0, which will disable all transmission gate from RDQS_t/RDQS_c to the RxDQS replica differential inputs.

Then, rxdqs_replica_offset_ctrl are set to 0 and the output of the RxDQS Replica are taken in by offset calibration finite state machine replica (OC CAL FSM REP) for RxDQS Replica for decision making. Recall that rxdqs_offset_ctrl=5'd0 yields maximum negative offset in Table 1. Since the inputs of RxDQS Replica are shorted and have the same voltage value, an output value of 1 should be expected from RxDQS Replica due to the strong negative offset inferred by rxdqs_offset_ctrl=5'd0. The process goes on iteratively to introduce positive offset until the RxDQS Replica output changes state from 1 to 0, which is the transition point where the intrinsic offset of RxDQS Replica changes from negative offset becomes positive offset.

The last code before triggering the transition is stored and applied as the final rxdqs_replica_offset_ctrl code. The RxDQS Replica Offset Calibration concludes, and the process continues onto RDQS Pad Voltage conditioning.

Example 2: RDQS Pad Voltage Conditioning

Figure 3:
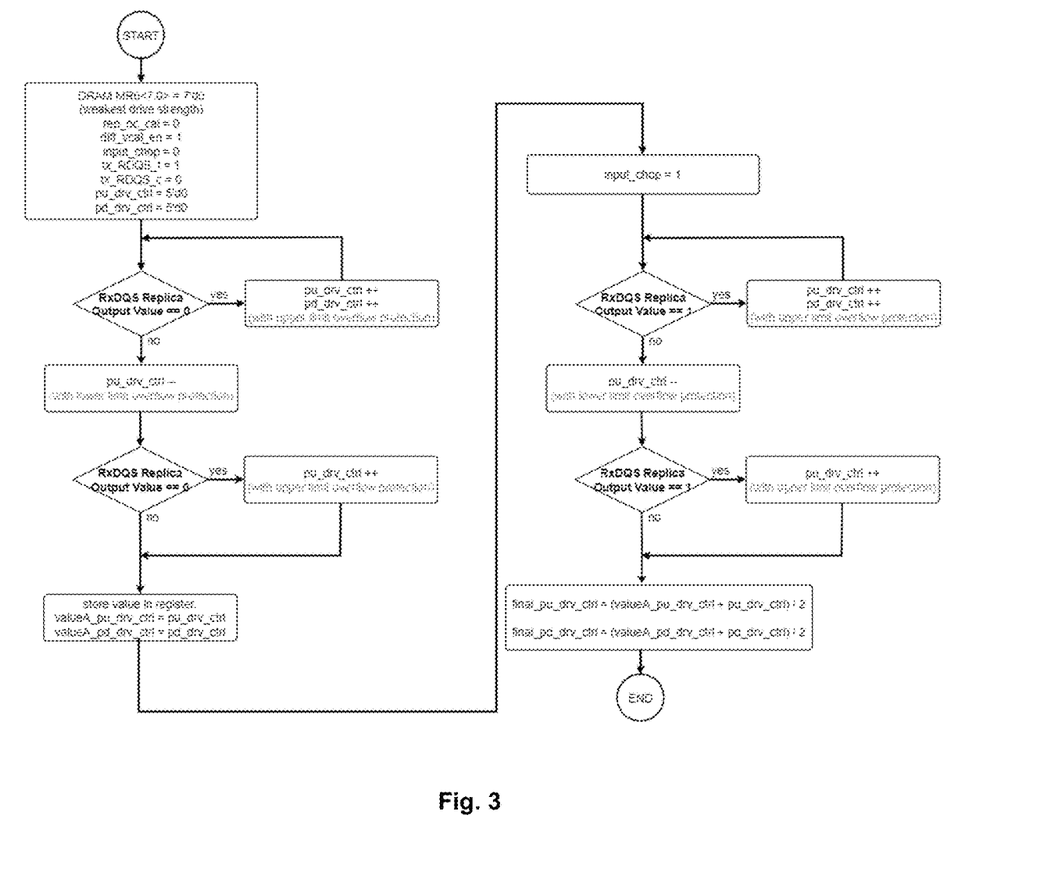
FIG. 3 is a flowchart illustrates a computer-implemented method of receiver read-data strobe pad voltage conditioning in accordance with an embodiment of the present invention.

After the offset of RxDQS Replica is calibrated, RxDQS Replica is used as a comparator to calibrate and condition the pad voltages, true read-data strobe (RDQS_t) and complement read-data strobe (RDQS_c) to a common voltage reference value. FIG. 3 illustrate the overall process of RDQS Pad voltage conditioning. The RDQS_t and RDQS_c voltages are passed to the inputs of RxDQS Replica by setting diff_vcal_en to 1. In addition, replica offset calibration (rep_oc_cal) must be set to "0" to prevent shorting to internal voltage reference through the transmission gates at the input of RxDQS Replica.

Further, the Mode Register 6 (MR6) of High Bandwidth Memory 3 (HBM3) device are programmed to be 7'd0 which will set the weakest Dynamic Random Access Memory (DRAM) driver strength option for both pull up and pull down. The transmitter for RDQS_t is then set to transmit logic "1" and transmitter for RDQS_c set to transmit logic "0". This will cause a potential divider to form at the RDQS_t and RDQS_c because DRAM transmits and drives "0" to RDQS_t and "1" to RDQS_c.

Figure 4:
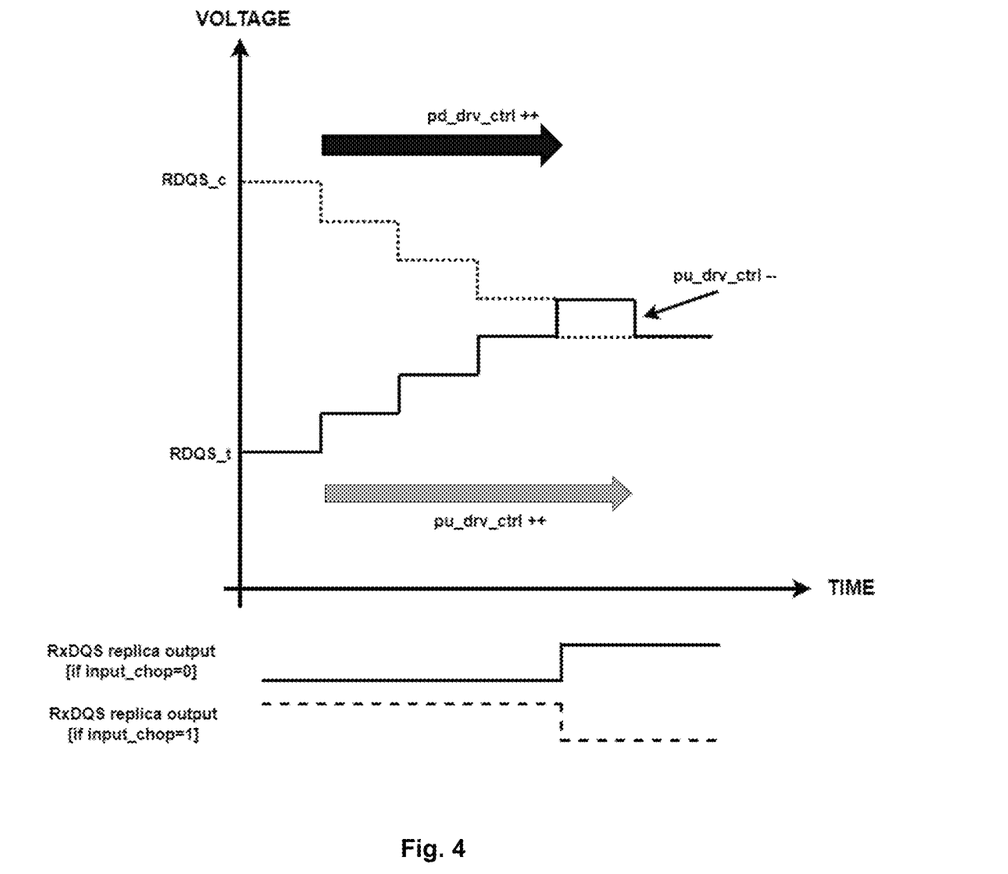
FIG. 4 illustrates an iterative process of pull up and pull down drive control adjustments in accordance with an embodiment of the present invention.
Figure 5:
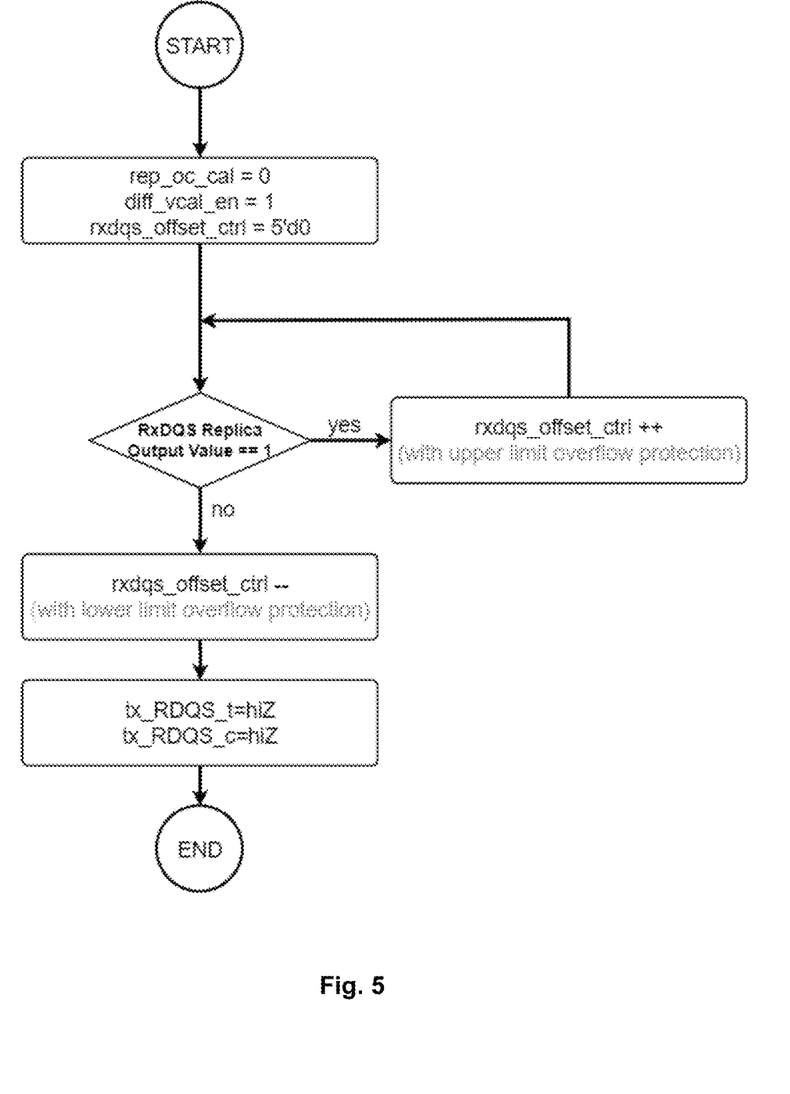
FIG. 5 is a flowchart illustrates a computer-implemented method of receiver read-data strobe offset calibration in accordance with an embodiment of the present invention.

FIG. 4 illustrate the pull up drive control (pu_drv_ctrl) and pull down drive control (pd_drv_ctrl) that controls the pull up and pull down drive strength of transmitter of read-data strobe are set to an initial value of 0 which is the weakest driver strength. It will then go through iterative process to lock the pu_drv_ctrl and pd_drv_ctrl value.

The pu_drv_ctrl and pd_drv_ctrl are calibrated two times, one with input chopping (input_chop) set to 0, and another with input_chop set to 1. The final pu_drv_ctrl and pd_drv_ctrl value are obtained by averaging their value obtained from input_chop 0 and 1. The main objective of the process is to nullify any residual offset in RxDQS Replica from affecting RDQS Pad Voltage conditioning. As a result, an accurate common voltage reference value for RDQS_t and RDQS_c can be achieved.

Example 3: RxDQS Offset Calibration

After RDQS Pad Voltage conditioning, the RDQS_t and RDQS_c voltages are now at a common voltage reference value, which can then be used to calibrate the offset of the receiver read-data strobe (RxDQS). FIG. 6 illustrate the overall process of RxDQS Offset Calibration. The process is very similar to RxDQS Replica Offset Calibration in Example 1, the only difference is that the common voltage reference value on the RxDQS inputs are achieved by RDQS Pad Voltage conditioning. After RxDQS offset is calibrated, transmitter RDQS_t and transmitter RDQS_c are configured to be tristate to allow the differential pad voltages to recover to proper electrical signalling before transitioning back to functional mode. As a summary, since there is no requirement of pad switch at the RxDQS input for offset calibration, the signal attenuation can be reduced and allow higher operational speed.

The present invention overcomes the shortcoming of the prior arts by providing offset calibration method for High Bandwidth Memory 3 (HBM3) preferably utilizing a proposed offset calibration method employing a pad voltage divide. The offset calibration method in present invention helps to reduce signal attenuation and allow higher operational speed.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

The invention claimed is:

1. A computer-implemented method for offset calibration of an integrated circuit (IC) memory controller, characterized in that said method comprises the step of:
    performing offset calibration of a receiver read-data strobe replica;
    conditioning pad voltages of a receiver read-data strobe and the receiver read-data strobe replica based on an offset calibration value of the receiver read-data strobe replica; and
    performing offset calibration of the receiver read-data strobe based on an offset calibration value of the pad voltages;
    wherein disabling differential inputs of transmission gate from a differential strobe signal pins to the receiver read-data strobe replica during receiver read-data strobe replica offset calibration.

2. The computer-implemented method as claimed in claim 1, wherein performing offset calibration of a receiver read-data strobe replica by the steps of:
    shortening and assigning differential inputs of the receiver read-data strobe replica to a common voltage reference value;
    outputting voltage value to offset calibration finite state machine for decision making; and repeating shorting until the receiver read-data strobe replica output changes to a transition point.

3. The computer-implemented method as claimed in claim 2, further comprises storing and applying the final receiver offset control code of the receiver read-data strobe replica based on the transition point.

4. The computer-implemented method as claimed in claim 1, wherein conditioning pad voltages of the receiver read-data strobe and the receiver read-data strobe replica based on the offset calibration value of the receiver replica comprising the steps of:
   calibrating and aligning the pad voltages, differential strobe signal to a common value based on the offset calibration value of the receiver read-data strobe replica;
   passing the differential strobe signal voltages to the inputs of receiver read-data strobe replica; and
   creating potential divider at the differential strobe signal for voltage transmission to the receiver read-data strobe.

5. The computer-implemented method as claimed in claim 1, wherein adjusting memory drive strength option for both pull up and pull down during read-data strobe pad voltage conditioning.

6. The computer-implemented method as claimed in claim 1, wherein executing dual calibration of drive control signal via input chop setting during read-data strobe pad voltage conditioning and averaging the result of calibration.

7. The computer-implemented method as claimed in claim 1, wherein performing offset calibration of the receiver read-data strobe based on the offset calibration value of the pad voltages comprising the steps of:
   assigning a common voltage reference on the receiver read-data strobe based on the calibration value of the pad voltage of the receiver read-data strobe;
   configuring transmitter of differential strobe signal to be tristate for recovering electrical signaling of the differential pad voltages; and
   transitioning back the differential pad voltages to functional mode.

8. An integrated circuit (IC) memory controller for offset calibration as claimed in claim 1, comprising:
   a receiver read-data strobe for receiving and processing read-data strobe signal;
   characterized by
   a receiver read-data strobe replica communicably connected to the receiver read-data strobe;
   a pad voltage divider connecting a pad voltage of the receiver read-data strobe and a pad voltage of the receiver read-data strobe replica; and
   a transmitter, each connected to true read-data strobe and complement read-data strobe to condition the pad voltages;
   wherein the receiver read-data strobe replica calibrates pad voltage of a differential voltage to a common voltage for the receiver read-data strobe offset calibration.

9. The integrated circuit (IC) memory controller as claimed in claim 8, wherein differential strobe signal pins are connected to receiver read-data strobe inputs.

10. The integrated circuit (IC) memory controller as claimed in claim 8, wherein transmitter of read-data strobe forms a potential divider with dynamic random access memory true read-data strobe and complement read-data strobe transmitter.

* * * * *